United States Patent
Frauen et al.

(10) Patent No.: US 7,966,729 B2
(45) Date of Patent: Jun. 28, 2011

(54) METHOD AND DEVICE FOR PRODUCING A FUSELAGE CELL OF AN AIRPLANE

(75) Inventors: Holger Frauen, Hamburg (DE); Tomas Gnauck, Neu Wulmstorf (DE); Eike Klemkow, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 52 days.

(21) Appl. No.: 12/635,302

(22) Filed: Dec. 10, 2009

(65) Prior Publication Data

US 2010/0192376 A1 Aug. 5, 2010

Related U.S. Application Data

(63) Continuation of application No. PCT/EP2008/057850, filed on Jun. 20, 2008.

(60) Provisional application No. 60/936,846, filed on Jun. 22, 2007.

(30) Foreign Application Priority Data

Jun. 22, 2007 (DE) .................. 10 2007 028 918

(51) Int. Cl.
  *B21D 53/88* (2006.01)
  *B25B 27/14* (2006.01)
(52) U.S. Cl. ..................... 29/897.2; 29/281.1
(58) Field of Classification Search .............. 29/897.2, 29/281.1, 525.06, 466, 467, 468, 469; 244/120, 244/2, 118.2, 119, 125, 136–137.4, 131, 244/139, 140, 117 R, 118.1
See application file for complete search history.

(56) References Cited

U.S. PATENT DOCUMENTS

| | | | |
|---|---|---|---|
| 5,086,996 A | 2/1992 | Roeder et al. | |
| 6,070,831 A * | 6/2000 | Vassiliev et al. | 244/120 |
| 6,237,210 B1 | 5/2001 | Stoewer et al. | |
| 6,408,517 B1 | 6/2002 | Lehmker et al. | |
| 7,234,667 B1 * | 6/2007 | Talmage, Jr. | 244/120 |

(Continued)

FOREIGN PATENT DOCUMENTS

| | | |
|---|---|---|
| DE | 10 2004 056286 A1 | 5/2006 |
| DE | 10 2005 023886 A1 | 12/2006 |

(Continued)

OTHER PUBLICATIONS

International Search Report with Written Opinion from PCT/EP2008/057850 dated Jan. 29, 2009.

*Primary Examiner* — John C Hong
(74) *Attorney, Agent, or Firm* — Jenkins, Wilson, Taylor & Hunt, P.A.

(57) ABSTRACT

The invention relates to a method for the economic production of entire fuselage cells of airplanes and to a site for carrying out the method. Differing from the conventional sectional assembly according to the invention separate shells (shell components) are attached to a substantially completed cockpit section and/or rear section. At this the half shell construction and the four shell construction as well as a combination hereof can be applied. Alternatively, the cockpit section and the rear section as well as the central wing box section can be aligned and positioned to each other in a site forming gaps in longitudinal direction. Subsequently, the shell components as well as the floor framework sections are adjusted circularly revolving between the sections and are ideally simultaneously connected to these by means of at least four cross-seams and a plurality of longitudinal seams.

16 Claims, 4 Drawing Sheets

U.S. PATENT DOCUMENTS

| | | |
|---|---|---|
| 2002/0007548 A1 | 1/2002 | Stoewer et al. |
| 2006/0060705 A1 | 3/2006 | Stulc et al. |
| 2006/0162140 A1 | 7/2006 | Frauen et al. |

FOREIGN PATENT DOCUMENTS

| | | |
|---|---|---|
| EP | 0 408 432 A | 1/1991 |
| EP | 0 976 472 A | 2/2000 |
| EP | 1 063 166 A | 12/2000 |
| FR | 2 906 785 A | 4/2008 |
| WO | WO 2009/000761 A2 | 12/2008 |
| WO | WO 2009/000761 A3 | 12/2008 |
| WO | WO 2009/000761 A4 | 12/2008 |

* cited by examiner

METHOD AND DEVICE FOR PRODUCING A FUSELAGE CELL OF AN AIRPLANE

CROSS-REFERENCE TO RELATED APPLICATIONS

This application is a continuation of PCT International Application No. PCT/EP2008/057850 filed Jun. 20, 2008, which claims the benefit of U.S. Provisional Application No. 60/936,846, filed Jun. 22, 2007 and German Patent Application No. 10 2007 028 918.0, filed Jun. 22, 2007, the entire disclosures of which are herein incorporated by reference.

FIELD OF THE INVENTION

The invention relates to a method for producing a fuselage cell of an airplane with an at least partially pre-fabricated cockpit section and with an at least partially pre-fabricated rear section.

Furthermore, the invention relates to a site for carrying out the method.

Nowadays, in aircraft construction the sectional construction for producing fuselage cells for aircrafts is widely used. According to this fuselage shells, particularly two side shells, an upper and a lower shell as well as a floor framework are joined to a fuselage section ("barrel") while forming longitudinal seams. For producing an entire fuselage cell, multiple fuselage sections and other components, as for instance the cockpit, the rear and the wing box are joined while forming lengthwise-seams. The fuselage shells can be made of aluminum alloys, carbon fiber reinforced plastic materials or other compound materials.

During integration of the fuselage sections to an entire fuselage cell, the problem of tolerance compensation between the fuselage sections to be joined arises. Particularly with fuselage sections having big diameters of up to 10 meters tolerance deviations, i.e., particularly deviations between a desired and an actual cross-sectional geometry of the fuselage section in the joint area cannot be completely avoided for manufacturing reasons.

SUMMARY OF THE INVENTION

The object of the invention is to create a novel method for fuselage cell assembly, which does not have the problem of tolerance compensation between the fuselage sections.

According to the invention, the object is achieved by a method according to patent claim 1 comprising the following work steps:

attaching at least two shell components to the cockpit section and/or to the rear section and to the central wing box section, wherein the at least two shell components are simultaneously connected to the cockpit section and/or to the rear section and the central wing box section, and integrating at least one floor framework section.

Circularly attaching the at least two shell components to a ready-made cockpit section and/or to a ready-made rear section results in an efficient production, wherein at the same time tolerance problems between the large components are avoided.

The attached shell components can be at least one upper shell, at least one lower shell as well as at least one floor framework section if the so-called half-shell construction is applied. Alternatively the so-called four shell construction can also be applied. In this case at least one upper shell, at least two side shells, at least one lower shell as well as at least one floor framework section are attached to the cockpit section and/or to the rear section. Both constructions can also be combined section by section.

According to an embodiment of the method it is provided that at least two side shells, at least one lower shell, at least one upper shell as shell components as well as at least one floor framework section are positioned with respect to the cockpit section and/or to the rear section, the two side shells, the lower shell as well as the upper shell are connected to the cockpit section and/or to the rear section while forming at least one circumferential cross-seam, and the two side shells, the one lower shell and the one upper shell are connected among each other while forming continuous longitudinal seams and the at least one floor framework section is connected to the side shells for generating the front and/or the back fuselage section.

Due to the successively or practically simultaneous attaching of the shell components, particularly of both side shells, of the upper and the lower shell as well as of the floor framework section in line with the four shell construction to an already entirely pre-fabricated and completed cockpit section and/or rear section for generating a front or a rear fuselage section the hitherto tolerance problem while joining entire fuselage cells from prefabricated fuselage sections (so-called "fuselage barrels") is nearly completely avoided. Possibly occurring tolerance deviations of the shell components can still be compensated for in a relatively easy manner during the connection process. The up to now subsequently required, extensive tolerance compensation procedures at the fuselage sections ("fuselage barrels"), particularly in the joint area can be omitted.

The preferably already entirely completed cockpit section and/or the accordingly prepared rear section (however, initially still without vertical tail and horizontal tail) is gradually circular "built around" with the shell components. Preferably in the four shell construction firstly both side shells and subsequently the upper and the lower shell are attached to at least one floor framework section. In the half shell construction and in case of the so-called "three-way" shell division it is proceeded accordingly. Deviations from the outlined assembly order are possible. The shell components can comprise a length of up to 30 meters.

In a variant for producing the entire fuselage cell after the production of the front and of the rear fuselage section for instance the fuselage sections can be attached and connected to a central wing box section on both sides.

A simultaneous production of the front and of the rear fuselage section is possible in a sufficiently big site. Moreover, in such a site the cockpit section and the rear section together with an in-between arranged central wing box section can be positioned in longitudinal direction in a row, distant from each other and can be processed simultaneously. After completion of the alignment procedure the shell components particularly at least four side shells, at least two upper shells, at least two lower shells as well as at least two floor frame sections in case of the four shell construction are each fitted simultaneously in the clearances between the cockpit section and the central wing box section and between the central wing box section and the rear section and are connected to these constituting a fuselage cell while forming at least four continuous cross-seams and at least eight continuous longitudinal seams. In case of the half shell construction can be proceeded accordingly whereas in this method only at least two upper shells (upper half shells), at least two lower shells (lower half shells) as well as at least two floor framework sections are required in the gaps between the cockpit section and the central wing box section and between the central wing box section and the rear section, respectively for forming the fuselage cell and only at least four continuous longitudinal seams have to be produced.

The connection of the shell components can be carried each with common rivet connections, bolted connections, glued connections or an arbitrary combination hereof. Alternatively, arbitrary welding methods, particularly laser welding and/or friction stir welding can be applied for joining. The longitudinal and cross-seams forming between the shell components are sealed by means of suitable permanently elastic and temperature resistant sealants.

According to an embodiment of the method the front and/or the rear fuselage section are simultaneously connected to a central wing box section while forming a second cross-seam.

At this at least the cockpit section or the rear section are positioned at the site in the simplest case. Subsequently, the distant alignment of the central wing box section, to which for completion merely the wings have to be attached, is carried out with reference to the cockpit section or to the rear section. Afterwards a sufficient number of shell components is fitted preferably circularly circumferential in the gap existing between both sections and is joined to these while forming at least two continuous cross-seams and multiple longitudinal seams.

The shell components are depending on whether the four shell construction or the half shell construction is applied either at least one upper shell, at least two side shells and at least one lower shell or at least two half shells. Independent from the constructional variant being applied in either case additionally a floor framework section is to be held out, that is to be positioned and to be joined with the shell components.

In a sufficiently large sized site the simultaneous, in longitudinal direction distant positioning of the cockpit section, the rear section as well as the central wing box section is basically possible. Subsequently, the shell components are fitted preferably circularly between the cockpit section and the central wing box section or the central wing box section and the rear section, respectively, and are afterwards joined by riveting, welding, particularly laser welding, friction stir welding or gluing.

For being able to produce even longer fuselage sections further side shells as well as upper and lower shells can be connected to the shell components which are already attached to the ready-made cockpit section and/or rear section. Alternatively it is possible to use longer shell components which each by itself already comprises the required length extent for forming the entire fuselage cell.

The novel production method can be applied advantageously for both, shell components formed from conventional aluminum alloy materials and such shell components formed from fiber compound materials.

Other advantageous embodiments of the method are presented in the further claims.

Moreover, the object of the invention is achieved by a site for carrying out the method according to claim 14 comprising the following features:
  at least one fastening device for receiving and positioning the cockpit section and/or the rear section with reference to the site, and
  at least two positioning devices for aligning at least two shell components.

Through this the site can be used for the production of a fuselage cell in the two shell construction or half shell construction as well as in the four shell construction.

An embodiment of the site provides that the site comprises the following, additional components, particularly for carrying out the four shell construction:
  at least two side positioning devices for receiving and aligning the at least two side shells,
  at least one upper positioning device for receiving and aligning the at least one upper shell,
  at least one cycling frame for receiving and aligning the at least one lower shell,
  at least one presenting frame for receiving and aligning the at least one floor framework section, and
  at least two handling devices particularly flex arm robots by which the shells are connectable to the cockpit section and/or to the rear section while forming longitudinal and cross-seams.

Therefore, the site allows for a nearly fully automated procedure of the method. The site is provided preferably for attaching shell components or shells, particularly at least two side shells and at least one upper and lower shell, respectively to an entirely pre-fabricated cockpit and/or rear section for creating a fuselage section wherein a connection of at least one floor framework section to the at least two side shells is preferably carried out simultaneously or promptly. The entire fuselage cell of an airplane is then formed by the both sided connection of a front and a rear fuselage section to a central wing box section.

The plurality of positioning devices provided in the device allow for the reception and alignment of the respective shell components each independent from each other—in each case in relation to the base area of the site and/or to the cockpit and/or to the rear section. At this positioning options exist in all three directions in space. For the integration of the floor framework section a presenting frame is provided which can be brought into the fuselage section being in the works and which can be aligned in space. For the final connection of the shell components to the cockpit and/or to the rear section and of the shell components among each other along longitudinal and cross-seams at least one handling device particularly a flex arm robot having at least six degrees of freedom is provided. The handling devices can be devices for riveting, screwing, gluing, sealing the shells or the shell components. Furthermore, additional handling devices can be provided for applying sealing means in the area of the longitudinal and cross-seams before the actual connecting procedure. Alternatively, the final connection of the components can also be carried out manually.

Likewise the connection of the floor framework sections to the side shells can be carried out with such handling devices or manually.

Moreover, the device can be designed for the simultaneous integration of the front and of the rear fuselage section. In this case partial sites in each of which the joining of the front and of the rear fuselage section takes places are designed mirror-inverted to each other.

According to an advantageous embodiment of the site it is provided that additional retaining devices for aligning and positioning a central wing box section which is at least partially prefabricated are present. In this case the cockpit section, the central wing box section and the rear section can be aligned in longitudinal direction distant from each other. Subsequently, the shell components are fitted into the gaps respectively formed between the sections by means of the positioning devices and are securely attached to these sections. At this on the one hand between the cockpit section and the central wing box section and on the other hand between the central wing box section and the rear section respectively at least two cross-seams are formed simultaneously. Parallel to this the production of the longitudinal seams between the shell components is carried out. In case of being designed for the four shell construction the site can at the same time be used for the half shell construction. Basically, the half shell construction and the four shell construction can be applied in a combined manner for the integration of the fuselage cell.

Due to the simultaneous production of in total at least four cross-seams between the sections the production efficiency can be increased considerably whereas on the other hand also the area need of the "central" site rises. In case of a cockpit section, a wing box section and a rear section without intermediate sections the number of cross-seams reduces to the number of "three". The number of cross-seams rises accordingly if intermediate sections are inserted between the cockpit section and the central wing box section and/or between the central wing box section and the rear section.

DESCRIPTION OF EXEMPLARY EMBODIMENTS

Figure 1:
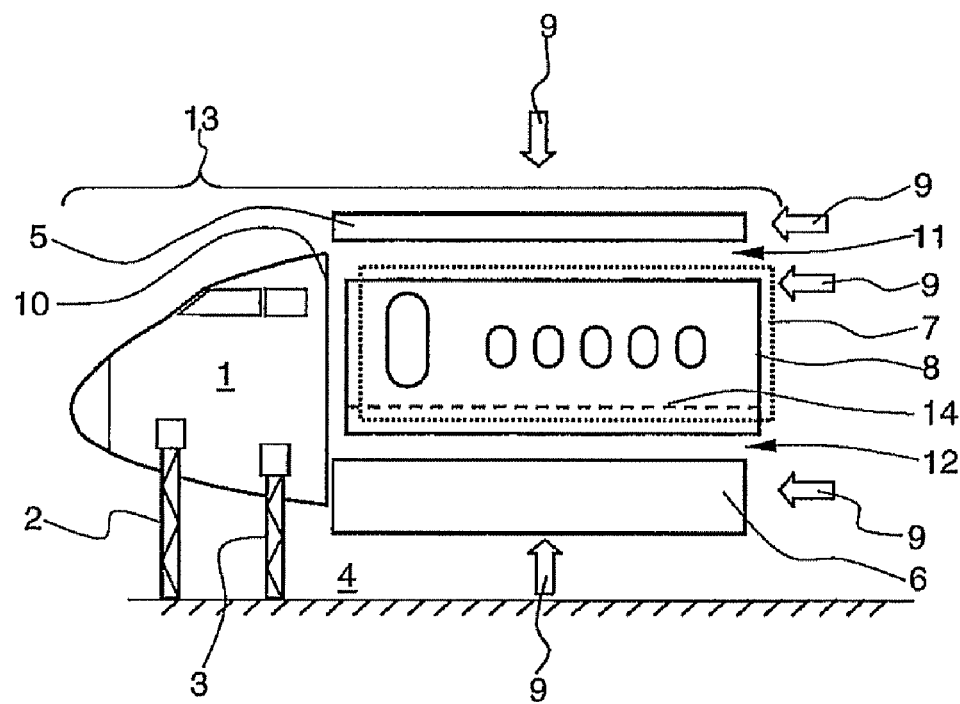
FIG. 1 a diagrammatic illustration of the procedure of the method while fabricating a front fuselage section, FIG. 2 a diagrammatic illustration of the procedure of the method while fabricating a rear fuselage section, FIG. 3 a diagrammatic illustration of an entire fuselage cell of an airplane comprising a front and a rear fuselage section as well as a central wing box section, FIG. 4 a cross-section through the fuselage cell according to FIG. 3 along the intersection line VI-VI, FIG. 5 a strongly simplified schematic illustration of the device for carrying out the method, and FIG. 6 the procedure of the method according to the invention during the so-called "half shell production" or half shell construction.

FIG. 1 shows an illustration of the procedure of the method during the production of a front fuselage section of a fuselage cell of an airplane.

An entirely pre-fabricated and already completed cockpit section 1 is firstly received by two retaining devices 2, 3 in a site 4 (base area of the site) and is positioned and/or aligned. Two further retaining devices are added to the retaining devices 2, 3 which are arranged behind these and are therefore not shown in the illustration of FIG. 1. The cockpit section 1 is received between these altogether four retaining devices and can be positioned in all three directions in space of the site 4. Subsequently a plurality of shell components (shells or fuselage cells) that is an upper shell 5, a lower shell 6 as well as two side shells 7, 8 are each positioned closer to the cockpit section 1 for instance in the direction of the arrows 9 by means of the positioning devices not shown in the illustration of FIG. 1 and are connected to the cockpit section while forming a circumferential cross-seam 10. The lower shell 6 is brought into the site 4 by means of a positioning device formed as a cycling frame (not shown) and is brought in position relative to the remaining shell component by lifting the lower shell 6. The connection of the shell components 5 to 8 is carried out by means of longitudinal seams of which only two longitudinal seams 11, 12 between the upper shell 5, the lower shell 6 and the side shell 7 representative for the remaining longitudinal seams have been provided with reference numbers. Finally, a floor framework section 14 can be brought into the such formed front fuselage section 13 and can preferably be connected on both sides to the side shells 7, 8. The positioning of the floor framework section 14 is carried out by means of a positioning frame not shown in FIG. 1 which can at least partially be brought into the front fuselage section 13. The floor framework section 14 can also be integrated into the fuselage section 13 during the assembly and the joining of the upper shell 5, the lower shell 6 as well as the side shells 7, 8. Alternatively, the floor framework section 14 can also be connected to the lower shell 6 in advance. Alternatively, the floor framework section 14 can firstly be connected to the cockpit section 1 wherein the fastening of both side shells 7, 8 is carried out subsequently and the connection to the lower shell 6 and to the upper shell 5 is finally carried out.

The final connecting of all shell components is carried out by means of conventional joining methods known in the art as for instance riveting, welding, screwing or gluing. The cross-seam 10 as well as the longitudinal seams 11, 12 are by default sealed with a permanently elastic and sufficiently heat-resistant sealant before the joining process. The production of the longitudinal seams 11, 12 and of the cross-seam 10 including the sealing is preferably carried out at least partially automated by means of a plurality of handling devices not shown, particularly flex arm robots each with at least six degrees of freedom. The handling devices can be arranged on positioning turrets which allow for additionally moving the handling devices parallel to the three directions in space over larger distances. In the range of a presenting frame which is preferably used for inserting the floor framework section 14 further handling devices can be provided so as to allow for a likewise at least partially automated connection of the floor framework section 14 to the remaining structure.

For the production of a front fuselage section with a bigger dimension further shell components are attached to the shell components which are already attached to the cockpit section 1 in the above described manner. Basically the shell component can measure up to 30 meters in length.

Figure 2:
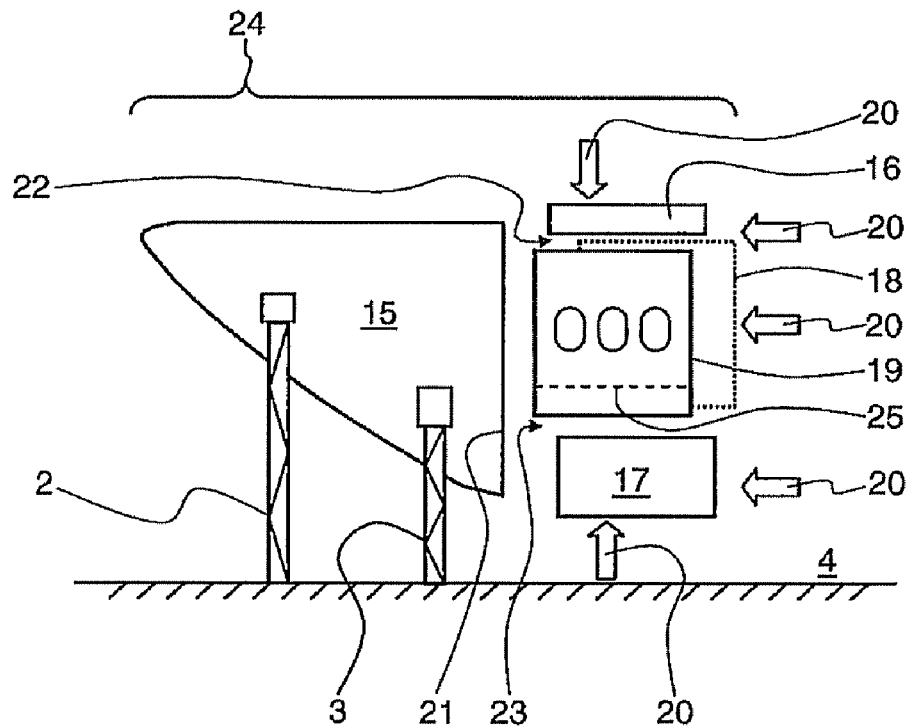

FIG. 2 illustrates diagrammatically the procedure of the method during the production of a rear fuselage section.

An in advance entirely finished rear section 15 is firstly received by the retaining devices 2, 3 and by both backmost, hidden retaining devices in the site 4 and is aligned. Subsequently, shell components that is an upper shell 16, a lower shell 17 as well as two side shells 18, 19 are in turn attached to the rear section 15 aligned parallel to the direction arrows 20 while forming a cross-seam 21. The alignment of the shell components in space is carried out by means of positioning devices not shown. Furthermore, the upper and the lower shell 16, 17 as well as the side shells 18, 19 are connected in longitudinal direction while forming longitudinal seams of which only the longitudinal seams 22, 23 representative for the remaining seams have been provided with a reference number. The rear section 15 together with the lower and the upper shells 16, 17 as well as both side shells 18, 19 constitute a rear fuselage section 24. A floor framework section 25 is finally or during the joining of the shell component preferably connected to the side shells 18, 19. The connecting of the shell components to the rear section 15 is carried out in the same manner as in case of the cockpit section (compare specification FIG. 1).

The production of the cross seams and of the longitudinal seams 21, 22, 23 is carried out as in the case of the production of the front fuselage section 13 by means of the conventional joining methods known in the art. As in the case of the front fuselage section 13 the sealing of the forming cross-seams and longitudinal seams 21, 22, 23 is carried out in advance by means of an elastic and sufficiently heat resistant sealant.

The essential advantage of the method according to the invention is that no ring-shaped, pre-fabricated sections but merely single shell components are attached to a pre-fabricated cockpit section and/or rear section for forming the fuselage cells so that a tolerance compensation is possible in a simple manner as long as the cross-seams and the longitudinal seams between the shell components and the cockpit section and/or the rear section are not yet continuously connected.

The procedure delineated in FIGS. 1 and 2 can simultaneously be carried out in a site.

Figure 3:
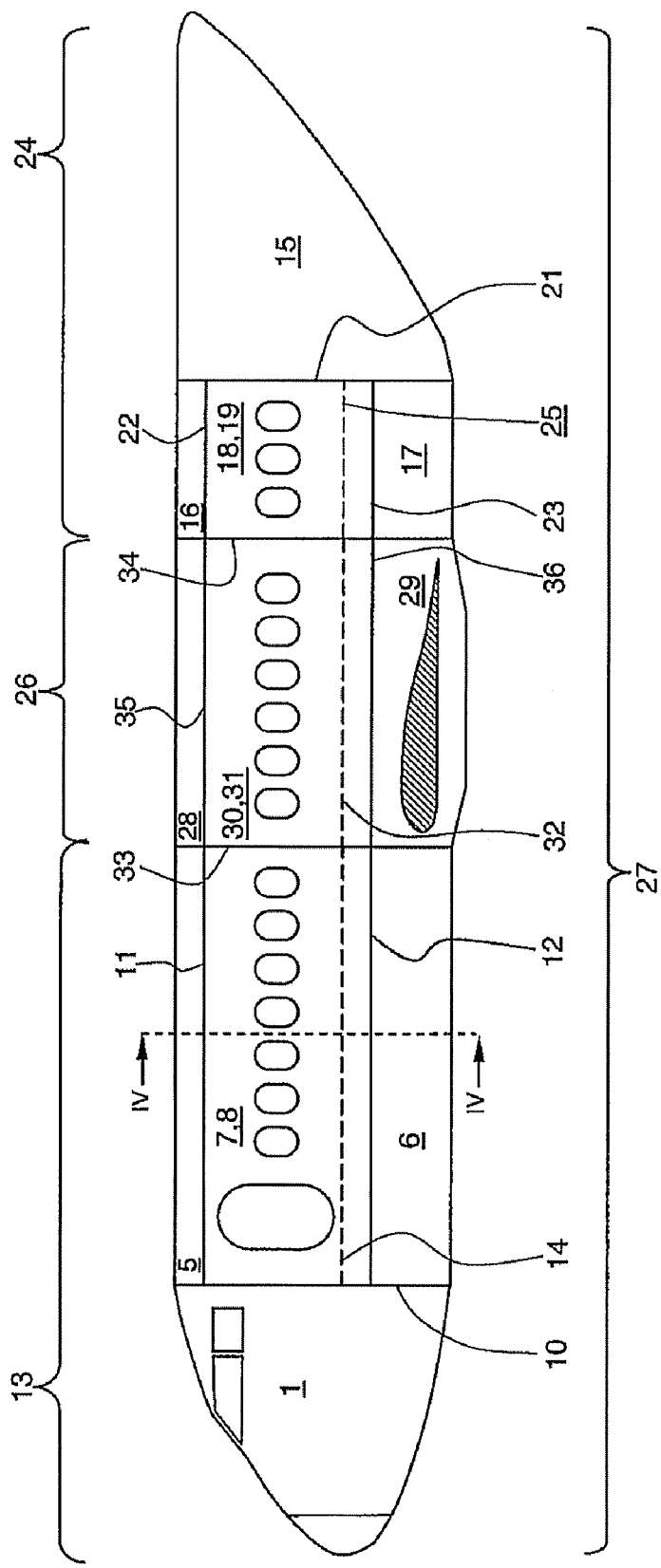

FIG. 3 shows a fuselage cell of an airplane built by means of the method according to the invention.

A central wing box section 26 is inserted between the front fuselage section 13 and the rear fuselage section 24. The front fuselage section 13 constitutes together with the rear fuselage section 24 as well as the central wing box section 26 the fuselage cell 27 of the airplane.

The front fuselage section 13 is built of the cockpit section 1 and the upper shell 5, the lower shell 6, the side shells 7, 8 and the floor framework section 14. Accordingly, the rear fuselage section 24 is built of the rear section 15, the upper shell 16, the lower shell 17 as well as both side shells 18, 19. The side shells 7 as well 19 are hidden in the illustration of FIG. 3.

Amongst other things the central wing box section 26 consists of an upper shell 28, a lower shell 29 with connecting areas for the wings on both sides and two side shells 30, 31 as well as a further floor framework section 32. The connection of the central wing box section 26 to the front fuselage section 13 and/or to the rear fuselage section 24 is carried out by means of cross-seams 33, 34. For reasons of clarity only the longitudinal seams 35, 36 of the longitudinal seams in the central wing box section 26 have been provided with reference numbers representative for the remaining longitudinal seams.

The supporting and positioning of the fuselage sections 13, 26, 24 is carried out by means of the positioning devices not shown in FIG. 3. Basically it is possible to carry out the joining of the fuselage cell 27 in a single site which then corresponds to a double embodiment of the site 4 (compare FIG. 1, 2) whereat positioning devices for handling the wing box section 26 are additionally provided. In this case the front fuselage section 13 and the rear fuselage section 24 as well as the central wing box section 26 can be built simultaneously according to the method in compliance with the invention.

The procedures delineated in FIG. 1, 2 can also be carried out parallely with the central wing box section 26 arranged in-between in an accordingly dimensioned site 4.

In this case for instance in a first step the cockpit section 1 is brought into the site 4 and positioned. Subsequently, the central wing box section 26 and the rear section 15 are positioned one after another in longitudinal direction distant from each other wherein on the one hand between the cockpit section 1 and the central wing box section 26 and on the other hand between the central wing box section 26 and the rear section 15 in each case a gap is formed which added together with the length measurements of the sections 1, 15, 26 corresponds approximately to the overall length of the fuselage cell 27 to be produced.

Subsequent to this in a second step the shell components that is in case of the so-called four shell construction at least two upper shells 5, 16, at least four side shells 7, 8, 18, 19, at least two lower shells 6, 17 as well as at least two floor framework sections 14, 25 are fitted preferably circularly revolving into the gaps between the cockpit section 1 and the central wing box section 26 and/or between the central wing box section 26 and the rear section 15 and are joined to these while forming at least four continuous cross-seams as well as at least eight continuous longitudinal seams.

The procedure is accordant in case of the so-called half shell construction whereat in distinction from the above described procedure merely upper shells and lower shells are used.

In a further variant of the method it is also possible to insert shell components in a site 4 only between the cockpit section 1 and the central wing box section 26 or between the central wing box section 26 and the rear section 15. Subsequently the attaching of the pre-fabricated cockpit section 1 or of the rear section 15 can be carried out in another site or in the same site so as to complete the fuselage cell 27 of the airplane.

Essential for carrying out the method according to the invention is that no classic "barrel assembly" of the fuselage cell is carried out but that fuselage section 13, 24, 26 are formed by means of successive and/or at least partially simultaneous attaching of shell components to a pre-fabricated cockpit section 1 and/or to a rear section 15 for the easier compensation of tolerance deviations.

Figure 4:
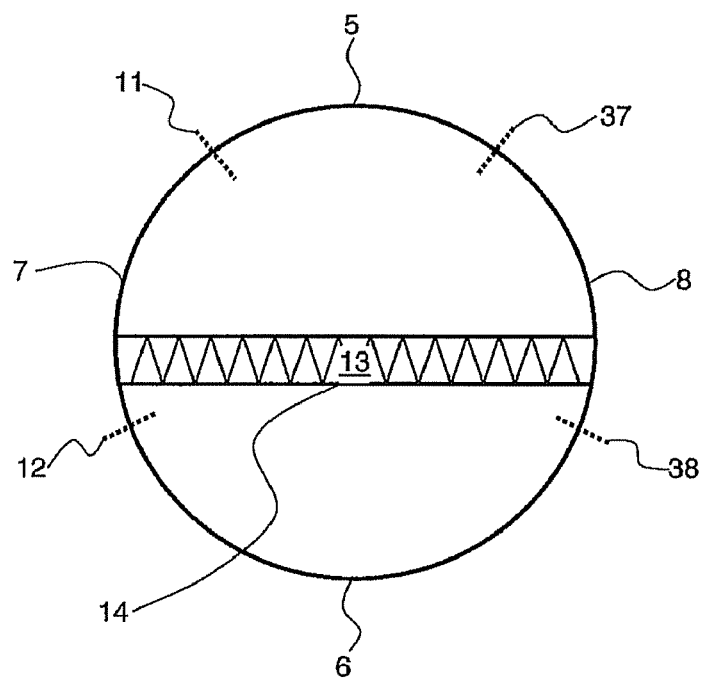

FIG. 4 shows a strongly diagrammatic sectional view through the front fuselage section of FIG. 3 along the intersection line IV-IV.

The front fuselage section 13 has a substantially circular cross-section geometry, however it can also have a cross-section geometry deviating hereof, for example an elliptic or oval cross-section geometry. The front fuselage section 13 is built of the upper shell 5, the lower shell 6 as well as both side shells 7, 8 along the intersection line IV-IV. Said shell components are connected among each other by means of the chain dotted symbolically shown longitudinal seams 11, 12 and 37, 38. The floor framework section 14 is fastened in a lower section of the side shells 7, 8.

Figure 5:
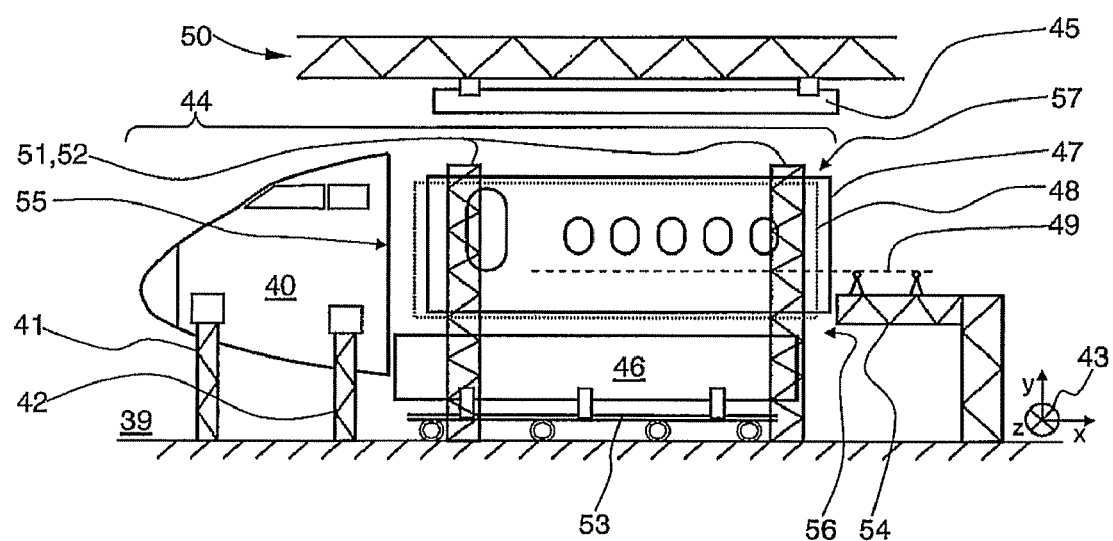

FIG. 5 shows a diagrammatic view of a site suitable for carrying out the method according to the invention.

An entire cockpit section 40 is located in a site 39. The cockpit section 40 is received in altogether four retaining devices of which for clarity reasons only both front retaining devices 41, 42 are shown. The retaining devices 41, 42 allow for a largely free positioning of the cockpit section 40 in all directions in space of the site 39 as indicated by the XYZ-coordinate system 43. For forming a front fuselage section 44 an upper shell 45, a lower shell 46 as well as two side shells 47, 48 are attached to the cockpit section 40. Furthermore a floor framework section 49 is brought into the front fuselage section 44. The positioning of the upper shell 45 in space is carried out by means of a so-called upper positioning device 50 which for example can be formed as a CNC-controlled portal arrangement. The positioning of both side shells 47, 48 is carried out by means of side positioning devices arranged on both longitudinal sides of the fuselage section 44 of which side positioning devices for clarity reasons only both front side positioning devices 51, 52 have a reference number. Both side positioning devices 51, 52 allow for a nearly free positioning of the side shells 47, 48 along the three directions in space of the coordinate system 43 within the site 39.

The positioning of the lower shell 46 is carried out by means of a cycling frame 53. The cycling frame 53 allows at least for a positioning of the lower shell 46 parallel to the base area of the site 39 that is at least within the ZX-plane of the coordinate system 43.

The inserting of the floor framework section 49 into the front fuselage section 44 is carried out by means of a so-called presenting frame 54. The presenting frame 54 also allows for a largely free alignment of the floor framework section 49 relative to the front fuselage section 44. Alternatively, the floor framework section 49 can firstly be connected to the cockpit section 40 and subsequently both side shells 47, 48 are connected to the floor framework section 49. The completion is then carried out by connecting the lower shell 46 and the upper shell 45 to both side shells 47, 48 as well as to the cockpit section 40.

The connection of the cockpit section 40 to the upper shell 45, both side shells 47, 48, the lower shell 46 as well as the floor framework section 49 is preferably carried out fully automated by means of a plurality of handling devices not shown in FIG. 5. The handling devices are particularly flex arm robots (standard industrial robots) with at least six degrees of freedom which as the case may be are additionally mounted on positioning turrets movable parallel to the XYZ-axes of the coordinate system 43 so as to facilitate an approach to the front fuselage section 44. The cockpit section 40, the upper shell 45, the lower shell 46 as well as both side shells 47, 48 are persistently connected to each other by means of a cross-seam 55 as well as longitudinal seams of which for clarity reasons only the longitudinal seams 56, 57 have a reference numeral so as to form the completed front fuselage section 44.

Sealing measures of the cross-seams and of the longitudinal seams 55 to 57 are likewise carried out by means of these handling devices or by means of additional devices.

All retaining devices 41, 42, the upper positioning device 50, the side positioning devices 51, 52, the cycling frame 53 as well as the presenting frame 54 of the site 39 are controlled by a central controller device particularly a complex CNC-control.

Differing from the illustration of FIG. 5 the site can also be designed for the simultaneous reception of a cockpit section 40 and a rear section not shown. In this case the site comprises the arrangement of positioning and retaining devices diagrammatically illustrated in FIG. 5, however it is arranged mirror-inverted to this. Moreover, the site can be equipped with further positioning and retaining devices for the reception of a central wing box section which is then aligned between the cockpit section and the rear section in relation to the site preferably by means of automatic retaining and positioning devices. This embodiment allows for a nearly fully automated production of an entire fuselage cell of an airplane comprising a front and a rear fuselage section with a central wing box section lying in between whereat a transport of the single fuselage sections is no longer required. Furthermore, the production efficiency as well as the precision of the process are considerably increased through this.

Furthermore in a site (not shown) elongated compared to the illustration of FIG. 5 a simultaneous aligning and/or positioning of the cockpit section, the central wing box section as well as the rear section can be carried out by a plurality of retaining devices not shown. At this the positioning of the sections is carried out one after another according to the longitudinal extension of the fuselage cell to be produced whereat on the one hand between the cockpit section and the central wing box section and on the other hand between the central wing box section and the rear section a defined gap is formed, respectively. The shell components preferably circularly revolving as well as the floor framework sections are then fitted into the gaps forming the completed fuselage cell and are joined with the sections. Multiple positioning devices and/or retaining devices are required for positioning the shell components and the floor framework sections.

Compared to the embodiments of the site 39 described above this variant calls for a considerably higher expenditure particularly with regard to the process control by the control devices and with respect to the constructive mechanical building.

Figure 6:
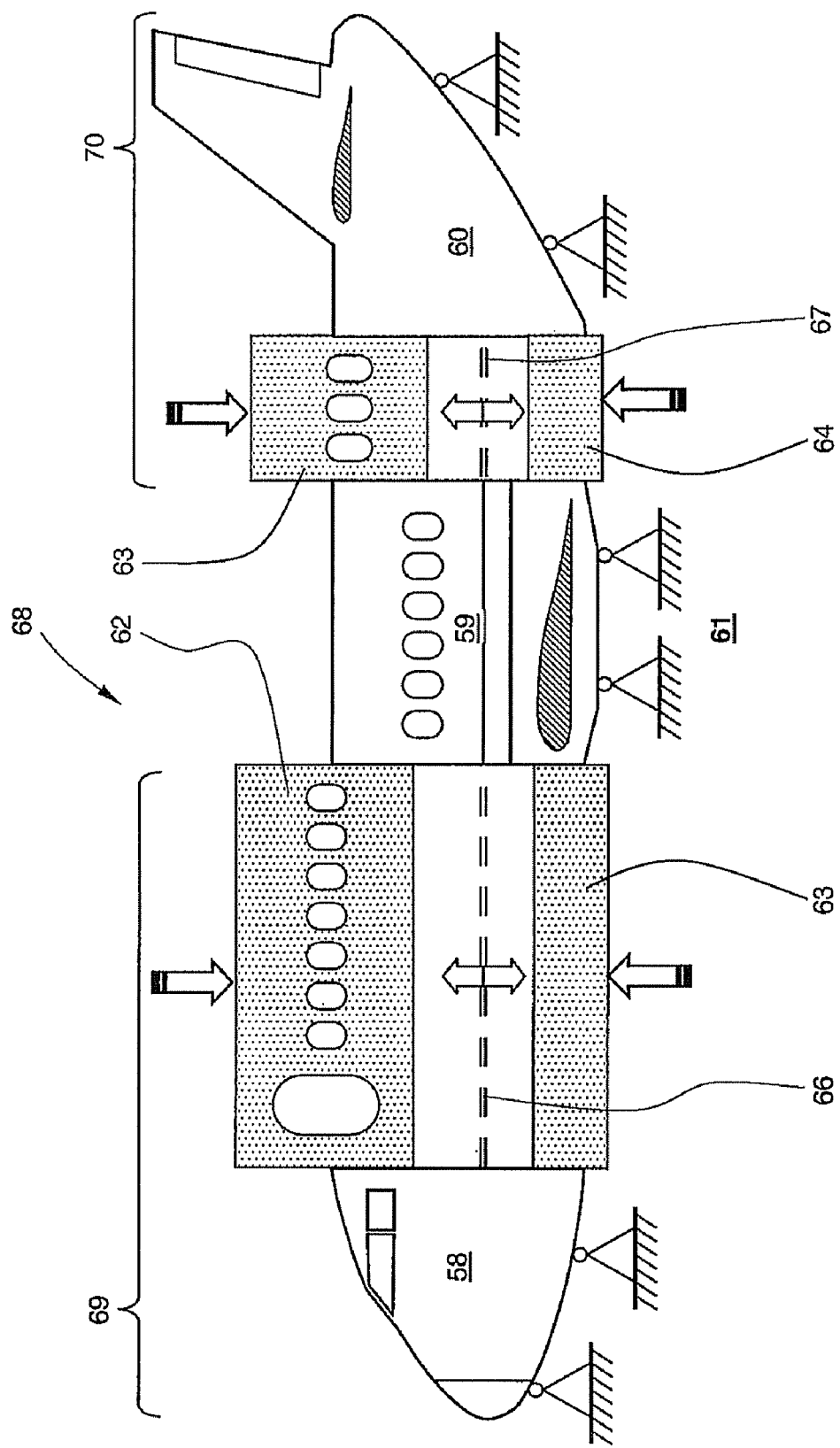

FIG. 6 shows the procedure of the method according to the invention in a strongly diagrammatic manner in case of the so-called "half shell production" whereat in this variant a cockpit section, a central wing box section as well as a rear section are simultaneously built around by the upper and the lower half shells in a site. A cockpit section 58, a central wing box section 59 as well as a rear section 60 are aligned and/or positioned in a site 61 in longitudinal direction distant from each other by means of retaining devices not shown. Subsequently, the upper shells 62, 63 (upper half shells) as well as the lower shells 64, 65 (lower half shells) are inserted and/or fitted in between the cockpit section 58 and the central wing box section 59 and between the central wing box section 59 and the rear section 60 in direction of the white arrows by means of positioning devices not shown. Simultaneously to this the positioning of both floor framework sections 66, 67 is likewise carried out by means of presenting frames not shown in direction of the white arrows. All sections and shell components are alignable and/or positionable not only in direction of the white arrows but in fact preferably in direction of all three directions in space, freely with respect to the site 61 by means of the positioning devices and the presenting frames as well as the retaining devices.

Preferably the cockpit section 50, the central wing box section 59 and the rear section 60 are firstly connected by means of the floor framework sections 66, 67. Subsequently, the lower shells 64, 65 as well as the upper shells 62, 63 are inserted and connected to the corresponding components and/or shell components. In case of the four shell construction the left side shells, the right side shells and the upper and lower shells take the place of the upper and the lower shells 62 to 65.

The preferably fully automated connection of the cockpit section 58, the central wing box section 59 and the rear section 60 to the shell components 62 to 65 each with a total of four cross-seams and longitudinal seams which for clarity reasons have not been provided with reference numerals in the drawing is carried out by means of handling devices which are likewise not shown. The production of the longitudinal seams and the cross-seams is also preferably carried out by means of fully automated handling devices, preferably by means of industrial flex arm robots with at least six degrees of freedom. Using the described method allows for a simultaneous production of a fuselage cell 68 of an airplane by means of a practically simultaneous assembly of a front and/or a rear fuselage section 69, 70 including the central wing box section 59 in a site 61.

All retaining devices, positioning devices and handling devices (flex arm robots) within the site 61 are controlled by means of a central controller device.

In case of the so-called "half shell construction" the lower half shell can be prepared in a prefabricated stage by joining a left side shell, a right side shell, a lower shell and by the insertion of a floor framework section in the area of the upper edges of both side shells.

Over and above the method can also be carried out using the so-called "three shell production" (so-called "three-way" shell division). In this case a left and a right side shell with a bigger height—because at the same time both side shells form the lower shell one half each—are connected to an upper shell and to a floor framework section arranged between both side shells, preferably inserted in advance, forming a completed fuselage section that is they are finally permanently connected. The joining that is the formation of the longitudinal and of the cross-seams between all components (shell components and/or sections) can be carried out using common joining methods particularly using riveting, gluing or welding methods.

LIST OF REFERENCE NUMERALS 1 cockpit section
2 retaining device
3 retaining device
4 site
5 upper shell
6 lower shell
7 side shell
8 side shell
9 directional arrow
10 cross-seam
11 longitudinal seam
12 longitudinal seam
13 front fuselage section
14 floor framework section
15 rear section
16 upper shell
17 lower shell
18 side shell
19 side shell
20 directional arrow
21 cross-seam
22 longitudinal seam
23 longitudinal seam
24 rear fuselage section
25 floor framework section
26 central wing box section
27 fuselage cell (airplane)
28 upper shell
29 lower shell
30 side shell
31 side shell
32 floor framework section
33 cross-seam
34 cross-seam
35 longitudinal seam
36 longitudinal seam
37 longitudinal seam
38 longitudinal seam
39 site
40 cockpit section
41 retaining device
42 retaining device
43 coordinate system
44 front fuselage section
45 upper shell
46 lower shell
47 side shell
48 side shell
49 floor framework section
50 upper positioning device
51 side positioning device
52 side positioning device
53 cycling frame
54 presenting frame
55 cross-seam
56 longitudinal seam
57 seam
58 cockpit section
59 central wing box section
60 rear section
61 site
62 upper shell (upper half shell)
63 upper shell (upper half shell)
64 lower shell (lower half shell)
65 lower shell (lower half shell)
66 floor framework section
67 floor framework section
68 fuselage cell (airplane)
69 front fuselage section
70 rear fuselage section

The invention claimed is:

1. A method for producing a fuselage cell of an airplane with an at least partially prefabricated cockpit section or with an at least partially prefabricated rear section and with a central wing box section comprising the following steps:
attaching at least two shell components to the cockpit section or to the rear section and to the central wing box section, wherein the at least two shell components are simultaneously connected to the cockpit section or to the rear section and the central wing box section, and
integrating at least one floor framework section.

2. The method according to claim 1, wherein
at least two side shells, at least one lower shell, at least one upper shell as shell components and at least one floor framework section are positioned relative to the cockpit section or to the rear section and to the central wing box section,
said side shells, said lower shell and said upper shell are connected to the cockpit section or to the rear section and to the central wing box section forming at least two circumferential cross-seams, and
said side shells, said lower shell and said upper shell are connected among each other by continuous longitudinal seams and said at least one floor framework section is connected to said side shells.

3. The method according to claim 2, wherein in each case at least two further side shells, in each case at least one further lower shell, in each case at least one further upper shell and in each case at least one further floor framework section are attached to a front fuselage section or to the rear fuselage section.

4. The method according to claim 2, wherein said cross-seams and said longitudinal seams are formed by rivet connections.

5. The method according to claim 2, wherein said cross-seams and said longitudinal seams are formed by screwing, gluing, welding or an arbitrary combination hereof.

6. The method according to claim 2, wherein said at least two side shells, said at least one upper shell and said at least one lower shell are formed from a fiber compound material.

7. The method according to claim 2 wherein said at least two side shells, said at least one upper shell and said at least one lower shell is formed from an aluminum alloy material.

8. A site comprising a plurality of retaining devices and/or positioning devices arranged on a base area for carrying out said method according to claim 2 in a half shell construction and/or in a four shell construction, further comprising
at least one retaining device for receiving and positioning the cockpit section, and/or the rear section relative to the site,
at least two positioning devices for aligning at least two shell components, and
at least one further retaining device for aligning a central wing box section.

9. The site according to claim 8, wherein said site further comprises for carrying out the four shell construction at least two side positioning devices for receiving and aligning said at least two side shells,
at least one upper positioning device for receiving and aligning said at least one upper shell,
at least one cycling frame for receiving and aligning said at least one lower shell, at least one presenting frame for receiving and aligning said at least one floor framework section and at least two handling devices by which said shell components can be connected to said cockpit section and/or to said rear section forming longitudinal seams and cross-seams.

10. The site according to claim 8, wherein at least two further handling devices are provided for connecting said at least one floor framework section to said at least two side shells.

11. The site according to claim 8, wherein at least two further handling devices are provided for producing and/or sealing longitudinal seams and cross-seams.

12. The method according to claim 1, wherein said method is carried out with at least one upper shell and with at least one lower shell as shell components and with at least one floor framework section.

13. The method according to claim 12, wherein at least one upper shell and at least one lower shell and at least one floor framework section are positioned between a cockpit section and a central wing box section, at least one upper shell and at least one lower shell and at least one floor framework section are positioned between said central wing box section and a rear section, and said upper shells, said lower shells and said floor framework sections are respectively connected among each other and respectively connected to said cockpit section, said central wing box section and said rear section forming cross-seams for forming a fuselage cell.

14. The method according to claim 13, wherein said cross-seams and said longitudinal seams are formed by riveting, screwing, gluing or an arbitrary combination hereof.

15. The method according to claim 12, wherein the upper shells and the lower shells are formed from a fiber compound material.

16. The method according to claim 12, wherein said upper shells and said lower shells are formed from an aluminum alloy material.

* * * * *